US006153838A

United States Patent [19]

Wadge

[11] Patent Number: 6,153,838

[45] Date of Patent: Nov. 28, 2000

[54] SWITCH LOCK-OFF MECHANISM

[75] Inventor: Brian Wadge, Durham, United Kingdom

[73] Assignee: Black & Decker Inc., Newark, Del.

[21] Appl. No.: 09/261,702

[22] Filed: Mar. 3, 1999

[30] Foreign Application Priority Data

Mar. 4, 1998 [GB] United Kingdom .................. 9804472

[51] Int. Cl.[7] .............................. H01H 3/20; H01H 9/20; H02K 7/14

[52] U.S. Cl. ............................... 200/50.01; 200/61.58 R; 200/43.16; 200/334; 310/50

[58] Field of Search .................................. 200/10, 61.85, 200/50.3, 50.31, 510, 520, 553, 557, 332.2, 43.13, 43.14, 43.16–43.19, 43.21, 43.22, 50.01, 52 R, 61.58 R, 334; 310/47, 50, 68 R

[56] References Cited

U.S. PATENT DOCUMENTS

| | | | |
|---|---|---|---|
| 3,130,759 | 4/1964 | Mohr | 310/50 X |
| 3,952,239 | 4/1976 | Owings et al. | 200/332.2 X |
| 3,973,179 | 8/1976 | Weber et al. | 200/332.2 X |
| 4,002,874 | 1/1977 | Brown | 200/321 |
| 4,050,003 | 9/1977 | Owings et al. | 310/50 X |
| 4,549,097 | 10/1985 | Ulmer | 200/61.85 X |
| 4,889,454 | 12/1989 | Hillestad et al. | 408/124 |
| 4,915,552 | 4/1990 | Hillestad et al. | 408/125 |
| 4,970,355 | 11/1990 | Haeusslein et al. | 200/50.31 |
| 5,065,476 | 11/1991 | Dohse et al. | 16/426 |
| 5,346,342 | 9/1994 | Winchester | 200/43.17 X |
| 5,407,381 | 4/1995 | Schaefer et al. | 451/358 |
| 5,577,600 | 11/1996 | Schoene et al. | 200/43.17 |

FOREIGN PATENT DOCUMENTS

| | | |
|---|---|---|
| 7902965 | 6/1979 | Germany . |
| 9010138 | 10/1990 | Germany . |
| 4023101 | 1/1992 | Germany . |
| 4130174 | 3/1993 | Germany . |

*Primary Examiner*—J. R. Scott
*Attorney, Agent, or Firm*—Bruce S. Shapiro

[57] ABSTRACT

A lock-off mechanism (80) for a power tool (2) comprises a longitudinally extended locking member (80) pivotally mounted within the power tool and having one end (86) resiliently biased into engagement with a power switch (12). The mechanism further comprising an actuation member extending substantially perpendicular to the locking member (80) so as to be displaceable transversely with respect to the locking member (80) and engagable therewith to effect cam engagement between a cam surface (300) of the actuation member and a cam surface (90) of the lever member (80) upon such transverse displacement of the actuation member, so as to pivotally displace the locking member (80) out of engagement with the switch (12).

23 Claims, 8 Drawing Sheets

SWITCH LOCK-OFF MECHANISM

BACKGROUND OF THE INVENTION

1. Field of the Invention

The present invention relates to a lock-off mechanism for a switch and in particular, to a lock-off mechanism for selectively locking the power switch on a power tool.

2. Description of the Related Art

Within the field of power tools it is desirable to prevent accidental activation of such a tool before the user wishes to do so. In the working environment it is conceivable that the conventional trigger switches used in such power tools may be accidentally activated and start operation of the power tool before the operator so desires, which in the case of cordless power tools can drain the power source without the operator achieving their objective. Such trigger switches may be activated accidentally when the operator picks the tool up and unwittingly grasps the trigger switch, or should the power tool be left unattended it may be knocked or dropped on the floor to again activate the switch. This problem may be further exaggerated in such power tools having a click-on click-off mechanism whereby once a tool is switched on it must be positively switched off.

Attempts have been made to overcome this problem in the past whereby the trigger switch of the power tool will have an associated lock-off mechanism, having a button projecting outwardly through the body of the power tool in the region of the trigger switch and which internal of the tool positively engages the trigger switch to prevent it being accidentally depressed. For the user to then utilise the tool this button must be pressed inwardly to disengage it from the trigger switch to then allow the operator to depress to the trigger switch when required. However, drawbacks of such conventional trigger switch locking mechanisms includes the awkward positioning of such a button whereby if the operator were to try and utilise the tool one-handed he would lose grip on the power tool by having to use an extra digit to first depress the button before using the trigger switch, or to alternatively use two hands, one of which to depress the button, the second of which to grip the tool and depress the trigger switch. In the case where power tools require to be held steady during operation e.g. a drill or reciprocating saw, this has the drawback of the operator losing stability of the tool when first switched on since the hand usually used to stabilise the tool will be required to de-activate the lock-off mechanism.

An alternative example of a lock-off mechanism is disclosed in UK Patent Application No. 9718305.7.

It is therefore an object of the present invention to provide a lock-off mechanism for a switch which alleviates the aforementioned problems to allow improved utilage of such a power tool.

BRIEF SUMMARY OF THE INVENTION

According to the present invention there is provided a lock-off mechanism for a power tool comprising a longitudinally extended locking member having one end resiliently biased into engagement with a power switch to restrain the switch from actuation and an actuation member displaceable transversely with respect to the locking member so as to engage the locking member remote from the one end to displace the locking member, against its biasing force, out of engagement with the switch. The use of a longitudinally extending locking member in this manner facilitates placement of the actuation member remote from the switch to allow the user to operate the actuation member with a second stabilising hand in a position where the users hand would usually be located to stabilise the power tool, i.e. in the operating tool head region.

Preferably, the locking member will be pivotally mounted about a point between the one end and the point of engagement with the actuating member for the one end to be pivotally displaced out of engagement with the switch when the locking member is engaged by the actuating member. Preferably, the locking member will be pivotable in a first plane extending longitudinally along the axis of the locking member and perpendicular to the transverse direction of displacement of the actuating member. This plane will usually extend so as to bisect the power tool along its length into two substantially symmetrical halves.

In order to facilitate operation of this mechanism the locking member will usually have a first axially inclined cam surface at its opposed end to the aforementioned one end, and the actuation member will have a co-operating second cam surface for cam engagement with the first cam surface so that transverse displacement of the actuating member will effect cam displacement of the locking member. It is preferred that the actuating member be resiliently biased to a neutral position with respect to the locking member and to be displaceable in either transverse direction so as to effect cam engagement between said first and second cam surfaces irrespective of said direction of displacement of some actuating member. This provides the advantage of allowing the mechanism to be operated by either a left-handed or right-handed person or to be used by either a thumb or a finger of the supporting hand to the users preference, since the actuating member may project from either side of the power tool and be accessible from both sides. In addition, it is a more straight forward operation to depress a button inwardly of the power tool than to effect sliding motion of a corresponding button arrangement. Preferably, the first cam surface has two faces inversely symmetrical about the first plane and the second cam surface will have two inversely symmetrical faces for co-operating engagement with said two faces of the first cam surface. In this manner, one of the cam surfaces will comprise a substantially V-shaped formation with the other of the cam surfaces forming an apex formation for co-operating alignment within the V-shaped formation of the other cam surface.

Further, according to the present invention there is provided a power tool comprising a lock-off mechanism as previously described and, preferably, such a power tool will comprise a tool body and a removable tool head whereby the locking member will be housed on the tool body and the actuating member will be housed on the tool head, whereby engagement between the body and the head will bring the actuating member into engagement with the locking member. Usually at least one of the first or second cam surfaces will extend outwardly of the tool body or tool head respectively so as to engage the other of the first or second cam surfaces.

A preferred embodiment of the present invention will now be described, by way of example only, with reference to the accompanying illustrative drawings in which:

FIG. 1 shows a front perspective view of a body portion of a power tool for receiving a detachable head;

FIG. 2 is the perspective view of FIG. 1 with half the clamshell removed;

FIG. 3 is a side elevation of the tool body of FIG. 1 with the half clamshell removed;

FIG. 4 is a side elevation of a tool head attachment configuration;

FIG. 5 is a side elevation of a tool body of FIG. 1 and the tool head connection system of FIG. 4 when joined together each with half clamshell removed;

FIG. 6 is a perspective view of a reciprocating saw tool head with part clamshell removed;

Figure 1:
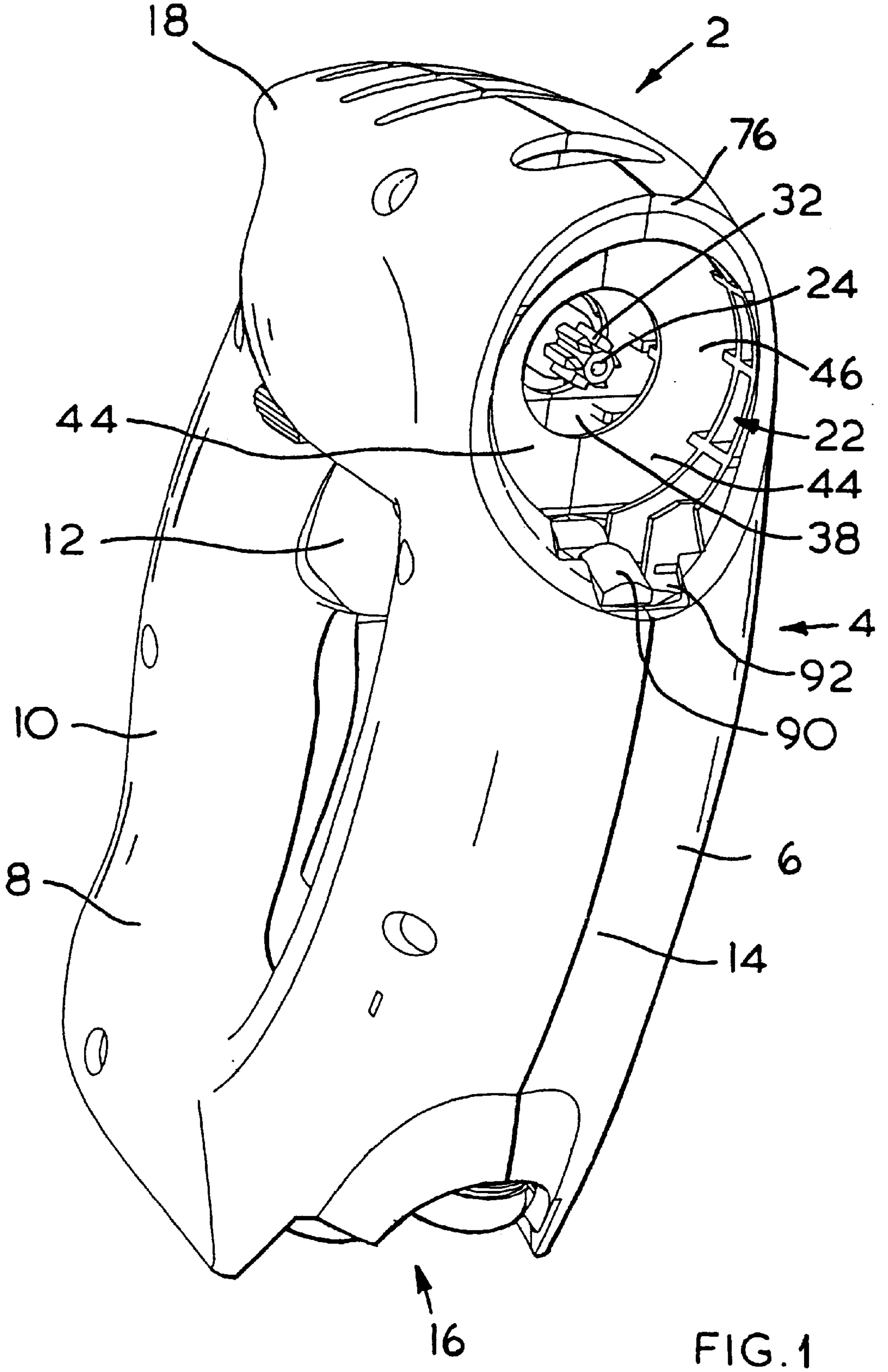
Referring now to FIG. 1, a power tool shown generally as (2) comprises a main body portion (4) conventionally formed from two halves of a plastic clamshell (6, 8). The two halves are fitted together to encapsulate the internal mechanism of the power tool to be described later. The basic design of the power tool has been substantially described in corresponding UK Patent Application No. 9718312.3.

The body portion (4) defines a substantially D-shaped body, of which a rear portion (10) defines a conventional pistol grip to be grasped by the user. Projecting inwardly of this rear portion (10) is a power switch in the form of a conventional trigger switch (12) which may be operable by the users index finger in a manner conventional to the design of power tools. Such a pistol grip design is conventional and will not be described further in reference to this embodiment. The front portion (14) of the D-shape body serves a dual purpose in providing a guard for the users hand when gripping the pistol grip portion (10) and also serves to accommodate two batteries (26) (FIG. 2) to provide the power source for the tool (2). The two halves of the clamshell (6, 8) define an opening shown generally as (16), which allows the batteries to be inserted within the tool. Such batteries are releasably restrained within the body portion by a conventional means and it will be appreciated to those skilled in the art that the inclusion of removable batteries (or battery packs) within power tools is well known and the mechanisms used to restrain and release such battery systems are also well known. As such, the batteries per se do not form part of the present invention and will not be described in further detail for this present invention.

DETAILED DESCRIPTION OF THE PREFERRED EMBODIMENT

The body portion (4) has an enlarged upper body section (18) extending between the front and rear portions (10, 14) which houses the power tool motor (20). Again, the motor (20) employed for this power tool is a conventional electric motor and will not be described in detail herein save for general functional description. This upper body section (18) further comprises a substantially cylindrical opening (22) defined by two halves of the clamshell (6, 8) through which access to an output spindle (24) of the motor (20) is provided.

Figure 2:
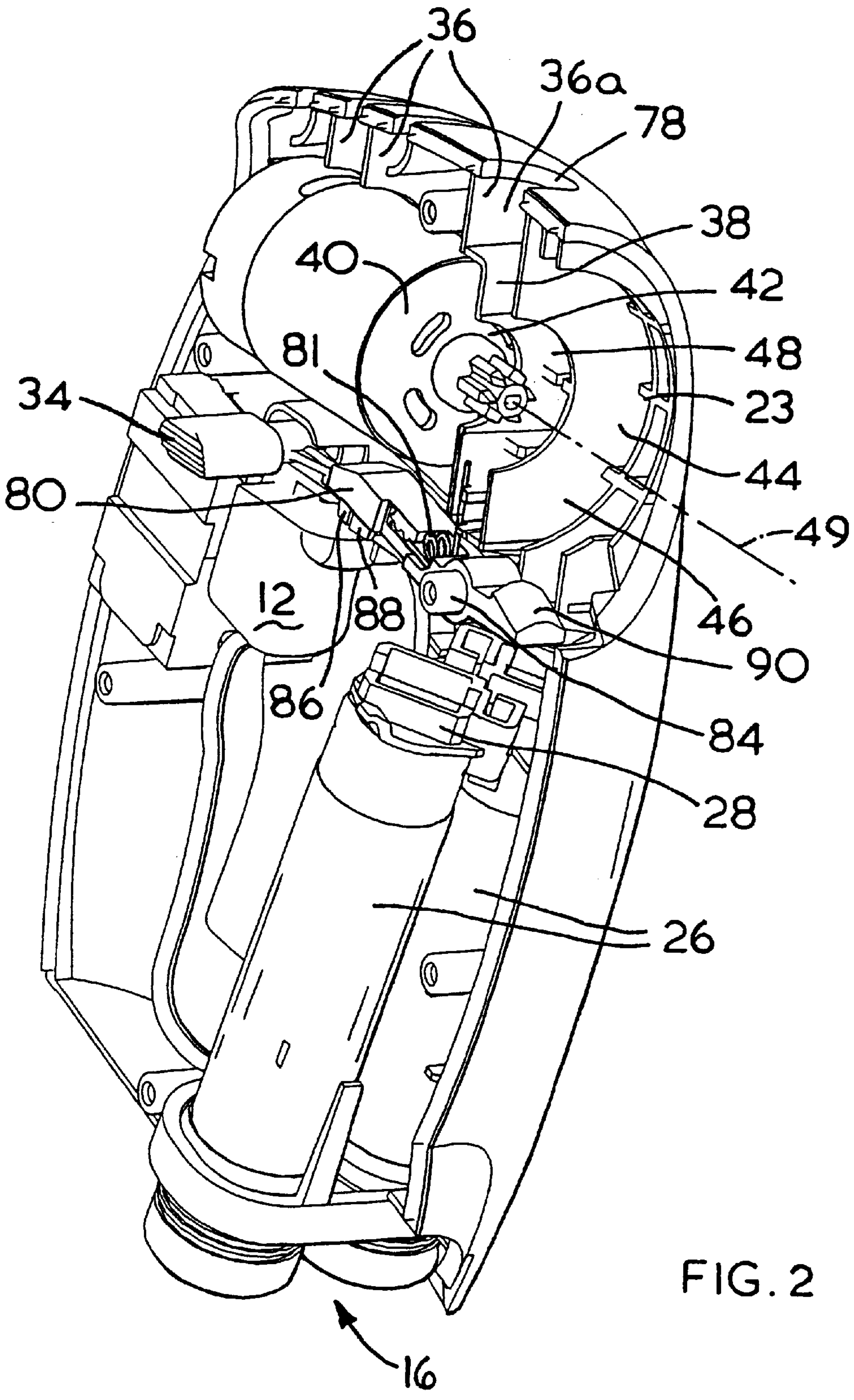
Figure 3:
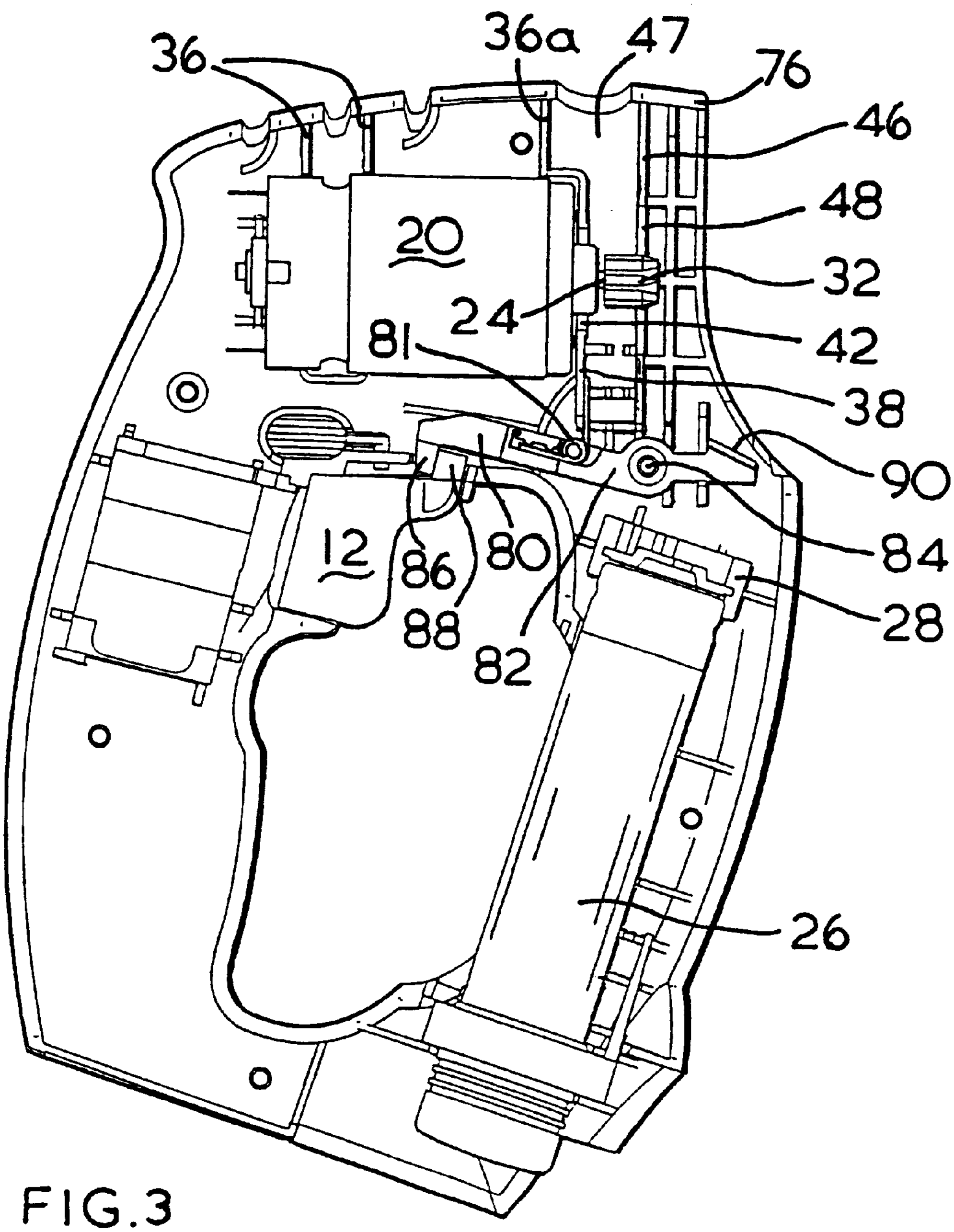

Referring now to FIGS. 2 and 3 the internal mechanism of the tool (2) will be described in more detail.

Two batteries (26) (only one of which is shown in FIG. 2) are received through the battery opening (16) in to the front portion (14) of the body (4) to electrically engage terminals (28). The batteries (26) are restrained within the tool body (4) by a detent mechanism (30) which is manually operable to facilitate removal of the batteries when so desired. Such a mechanism is conventional within the field of removable battery packs and will not be described further. The electrical terminals (28) are electrically coupled to the motor (20) via the trigger (12) in a conventional manner. (Note, for clarity in the drawings the electrical connections are not shown but comprise insulated wire connections of conventional design.) Upon actuation of the trigger (12) the user selectively couples the motor (20) to the batteries (26) thereby energising the motor (20) which in turn rotates an output spindle (24) to provide a high speed rotary output drive. As can be seen from FIGS. 1 and 3 the spindle (24) has a male cog (32) attachment for mesh engagement with a drive mechanism female cog on a power tool head which will be described hereinafter.

As is conventional for modern power tools, the motor (20) is provided with a forward/reverse switch (34) which, on operation, facilitates reversal of the terminal connections between the batteries (26) and the motor (20) (via switch 12) thereby reversing the direction of rotation of the motor output as desired by the user. Again such a mechanism is conventional within the field of power tools.

Referring now to FIG. 2, which shows the power tool (2) having one of the clamshells (8) removed to show, in perspective the internal workings of the tool, it will be seen that the motor is supported by conventional clamshell ribs (shown generally at (36) and which are mirrored by compatible ribs on the clamshell (8)) to restrain the motor within the clamshell. The foremost of these ribs **(36*a*) (FIG. 3) forms a front extension plate (38) which (in conjunction with the comparable front extension plate on the removed clamshell portion (8)) substantially encloses the front of the motor (40) save for a circular aperture (42) through which the motor spindle (24) projects. The circular aperture (42) is co-axial wit h the motor spindle axis (49). The two clamshell halves (6, 8) further comprise two semi-circular plates (44) disposed forward of the front extension plate (38) and substantially parallel therewith to form a second, outer extension plate (46) again having a circular aperture (48) to facilitate access to the motor spindle (24). Both apertures (42 and 48) are disposed co-axially on the axis (49). As can be seen from FIG. 2 the two extension plates (38, 46) serve to define a chamber (47) about the spindle axis (49), externally accessible through the aperture (48) and which substantially houses the spindle cog (32)**.

Furthermore, the outer extension plate (46) is itself recessed within the cylindrical opening (22) (thus forming a substantially cylindrical chamber between the opening (22) and the plate (46)) so that the spindle cog (32) does not project outwardly of the body portion (4).

The power tool (2) comprises a plurality of interchangeable tool head attachments which are attachable to the body portion (4) to form a particular type of power tool having a dedicated function. The particular types of tool head will include, amongst others, a conventional drill chuck, a reciprocating saw drive mechanism and a detail sander. Each of the tool head attachments will have a drive mechanism for engagement with the spindle cog (32) so that the motor (20) will drive the drive mechanism of each tool head.

Figure 4:
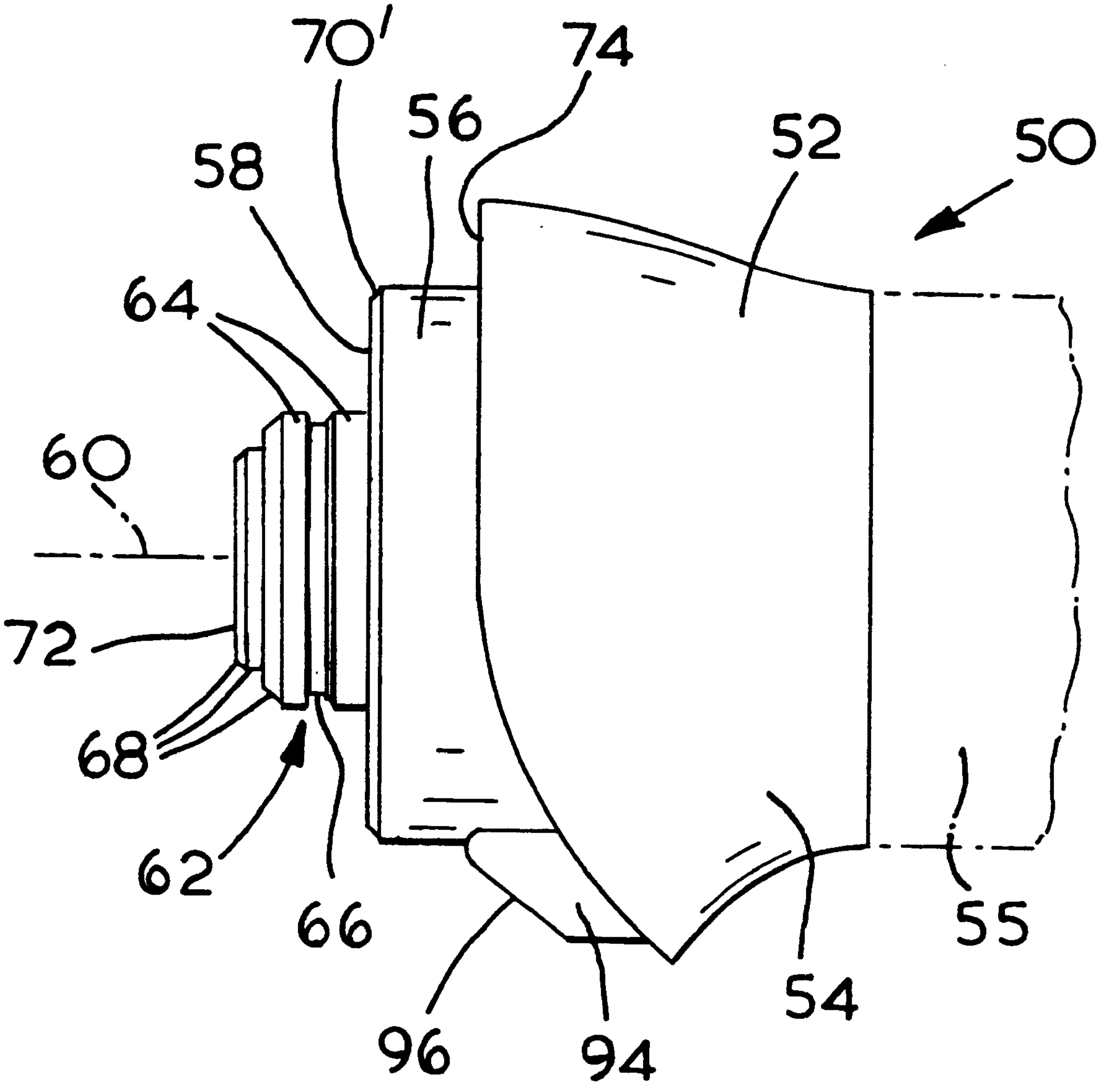

Referring now to FIG. 4, each of the tool head attachments (referred to generally as (50)) have a uniform connection system (52) shown in FIG. 4 in solid lines. This tool head connection system (52) comprises a substantially cylindrical outer body portion (54) which is ergonomically designed to match the exterior contours of the body portion (4) when the attachment is connected thereto. This overall tool head design will vary for different types of tool head attachments and generally serves to provide a different profile to the power tool dependent on its particular function. The design shown in FIG. 4 however is uniform for all head attachments and will carry the tool head functional body shown generally at (55).

Extending rearwardly of this outer body portion (54) is a substantially cylindrical spigot (56) which is shaped so as to fit snugly within the cylindrical opening (22) of the body portion (4). As seen in FIG. 2, the cylindrical opening (22) of the body portion is defined by a series of inwardly directed ribs (23) forming a substantially cylindrical chamber. This cylindrical spigot (56) has a substantially flat circular rear wall (58) disposed about a head axis (60). Projecting rearwardly of this wall (58) so as to extend co-axially with the axis (60) is a second, substantially cylindrical and hollow spigot (62) having a diameter substantially less than the diameter of the spigot (56). This hollow spigot (62) has a series of exterior cylindrical ribs (64) which define an outer cylindrical recess (66). In addition, the spigot (62) has a gradually increasing exterior diameter formed by a series of chamfered steps shown generally at (68) inclined radially outward from the axis (60) in a direction from left to right as viewed in FIG. 4. These chamfered steps (68) provide inclined lead-in shoulders on the spigot (62) to form a generally tapered spigot. In addition, the spigot (56) also has a chamfered step (70) again forming an inclined lead-in cam surface.

Thus, as the tool attachment (50) is brought into engagement with the body portion (4) the connection system (52) is inserted into the cylindrical opening (22) of the body portion (4) for the tool attachment axis (60) to extend substantially co-axially with the spindle axis (49). As the connection system (52) passes into the cylindrical opening (22) the chamfered leading edge (70) may abut the ribs (23) so as to maintain the head attachment (50) co-axial with the spindle axis (49). As such, the lead-in edge (70) serves as a guide surface. Further insertion of the connection system (52) into the opening (22) will cause the hollow cylindrical spigot (62) to pass through the aperture (48) in the outer extension plate (46) so as to encompass the spindle cog (32).

Figure 5:
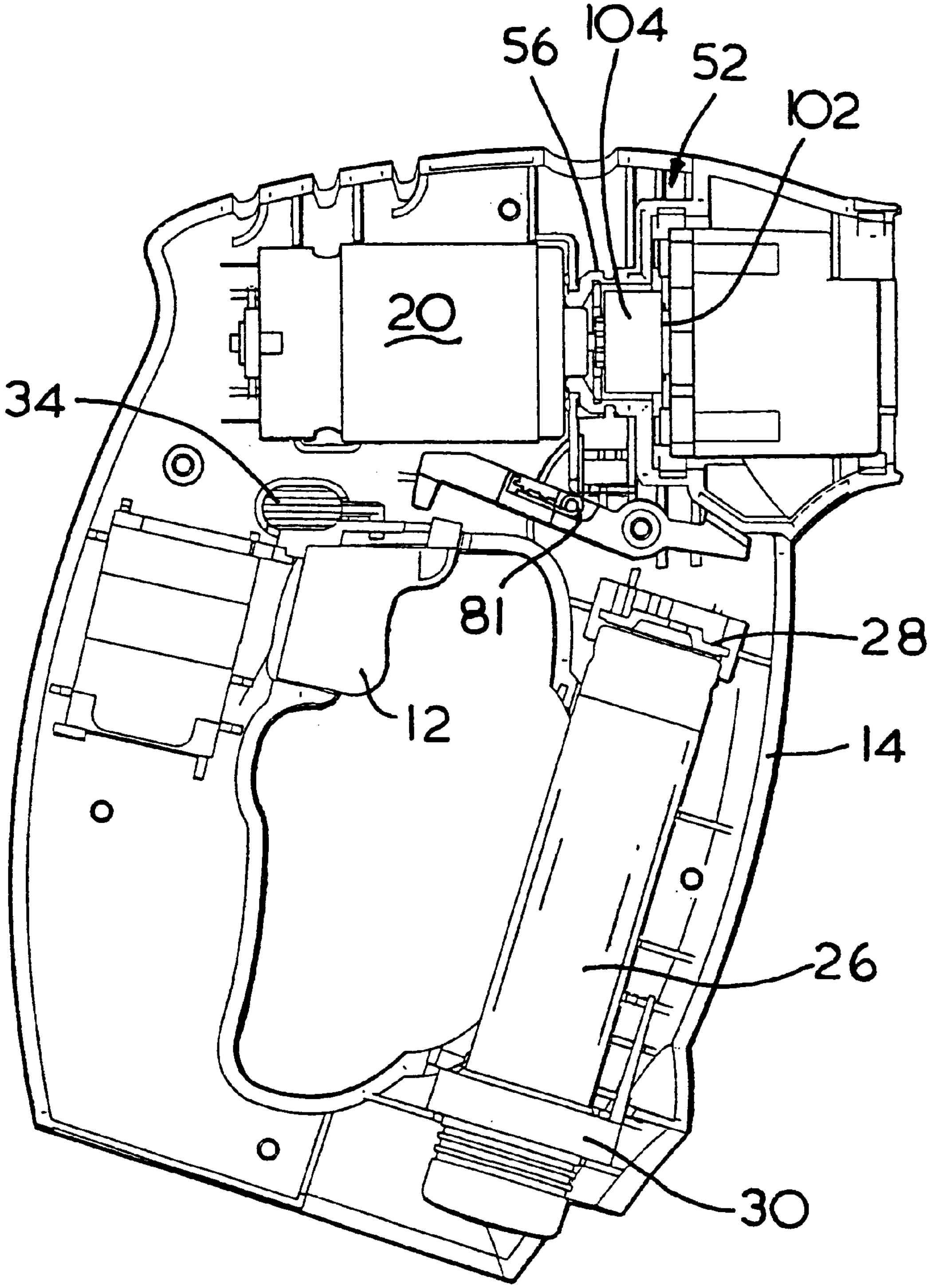

As can be seen from FIG. 5 showing the head attachment (50) connected to the body (4) the inner aperture (42) of the front extension plate (38) has a smaller diameter than the aperture (48) of the outer extension plate (46). Furthermore, the remote end (72) of the spigot (62) has a diameter corresponding substantially to the diameter of the aperture (42) whereas the inner diameter of the spigot (62) has a diameter corresponding to the diameter of the aperture (48). In this manner, as the tapered spigot (62) is inserted into the body portion (4) the spigot (62) will be received in a complimentary fit within the apertures (42 and 48) as shown in FIG. 5. In this manner the front extension plate (38) and outer extension plate (46) serve to firmly receive the spigot of the connection system (52) to restrain the connection system from axial displacement within the power tool body portion (4). This axial support of the connection system is assisted by the snug fit of the spigot (56) within the cylindrical opening (22). A shoulder portion (74) formed between the outer body portion (54) and the spigot (56) serves to restrain the connection system from further displacement of the connection system axially by its abutment against the outer rim (76) of the clamshell, (FIG. 5).

To restrain the tool attachment (50) in connection with the body portion (4), the body portion (4) is further provided with a resiliently biased locking mechanism within the chamber (47) (defined between the front extension plate (38) and outer extension plate (46) (FIG. 3)). This locking means (which is not shown in the attached drawings) comprises a resilient mechanism comprising two resiliently biased spring wires and disposed symmetrically about the axis (60) which extend across the apertures (42 and 48) so that as the connection system (52) passes through the aperture (48) the chamfered steps (68) of the spigot (62) will engage the biased wires and deflect them out of the path of the cylindrical spigot (56). Further insertion of the spigot (62) into the body portion (4) will then enable these resiliently deflected wires to encounter the cylindrical recess (66) on the spigot (56) and, by returning to the resiliently biased position snap engage with this recess (66) to restrain the connection system (52) from further axially displacement. In addition this locking mechanism is provided with a conventional push button (not shown) which extends through an aperture (78) in the body (4) whereby actuation of this push button will cause the two wires to be pushed apart so that they are moved out of engagement with the cylindrical recess (66) in the connection system (52) to thereby release the tool attachment head (50) when required.

The power tool (2) is further provided with an intelligent lock-off mechanism which is intended to prevent actuation of the trigger switch (12) when there is no tool head attachment (50) connected to the body portion (4). Such a lock-off mechanism serves a dual purpose of preventing the power tool from being switched on accidentally and thus draining the power source (batteries) whilst it also serves as a safety feature to prevent the power tool being switched on when there is no tool head attached which would present a high speed rotation of the spindle cog (32) (at speeds approaching 15,000rpm).

The lock-off mechanism (80) comprises a pivoted lever switch member (82) pivotally mounted about a pin (84) which is moulded integrally with the clamshell (6). The switch member (82) is substantially a elongate plastics pin having at its innermost end a downwardly directed projection (86) which is biased by a conventional helical spring 81 in a downwards direction to the position as shown in FIGS. 2 and 3 so as to abut the trigger switch (12). The trigger switch (12) comprises an upstanding projection (88) presenting a rearwardly directed shoulder which engages the pivot pin projection (86) when the lock-off mechanism (80) is in the unactuated position (FIG. 2).

In order to operate the actuating trigger switch (12) it is necessary for the user to depress the trigger switch (12) with their index finger so as to displace the switch (12) from right to left as viewed in FIG. 3. However, the abutment of the trigger projection (88) against the projection (86) of the lock-off mechanism restrains the trigger switch (12) from displacement in this manner.

The opposite end of the switch member (82) has an outwardly directed cam surface (90) being inclined to form a substantially wedge shaped profile as seen in FIG. 2.

Referring now to FIG. 1 it is seen that the two halves of the clamshell (6 and 8) in the region of the cylindrical opening (22) form a substantially rectangular channel (92) (in cross-section) extending downwardly from the periphery of this cylindrical opening (22) and which is shown generally as (92). The cam surface (90) is received within this channel (92) so a to be presented outwardly of the body portion (4) (FIG. 1).

Referring now to FIG. 4 the tool attachment (50) has an additional projection (94) which is substantially rectangular in cross-section and presents an inclined cam surface (96) which is inclined radially outwardly from the axis (60) in a direction away from the spigot (62). This projection (94) has a cross-sectional profile compatible with the rectangular channel (92) of the body (4) and is designed to be received therein. This projection (94) thus serves a dual purpose (i) as an orientation mechanism requiring the tool head to be correctly orientated about its axis (60) relative to the body portion (4) in order that this projection (94) is received within the rectangular channel (92) (which thus serves to position the tool head in a pre-determined alignment relative to the body portion) whilst (ii) the cam surface (96) serves to engage the cam surface (90) of the lock-off mechanism (80) so that continued displacement of the tool attachment (50) towards the body portion (4) causes cam engagement between the cam surfaces (96 and 90). This cam engagement causes pivotal deflection of the switch member (82) about the pin (84) (against the resilient biasing of the helical spring (not shown)) and to thus move the projection (86) in an upwards direction (to the actuated position as shown in FIG. 3), thus moving this projection (86) out of engagement with the trigger projection (88) which thus allows the actuating trigger (12) to be displaced as required by the user to switch the power tool on as required. This attachment of the tool head automatically de-activates the lock-off mechanism.

However, in certain circumstances it may be desirable for the tool head to comprise a manual de-activation means for engagement of the cam surface (90) of the lock-off mechanism (80). In particular, in certain forms of power tool it is desirable for the lock-off mechanism to remain engaged with the trigger switch (12) even when the tool head is attached to the body, whereby the lock-of mechanism (80) is required to be manually operated. In this manner, even when the tool head is attached, the power tool itself cannot accidentally be switched on by accidental depression of the switch (12). This provides for a power tool having a manual, and not automatic, de-activation of the lock-off mechanism. It will be appreciated that this additional feature is optional for the various types of tool head.

A manually operable actuation mechanism for the lock-off mechanism (80) will now be described, by way of illustration only, with reference to a reciprocating saw head attachment for the power tool, but it will be appreciated that such mechanism may be employed by any power tool head attachment.

Figure 6:
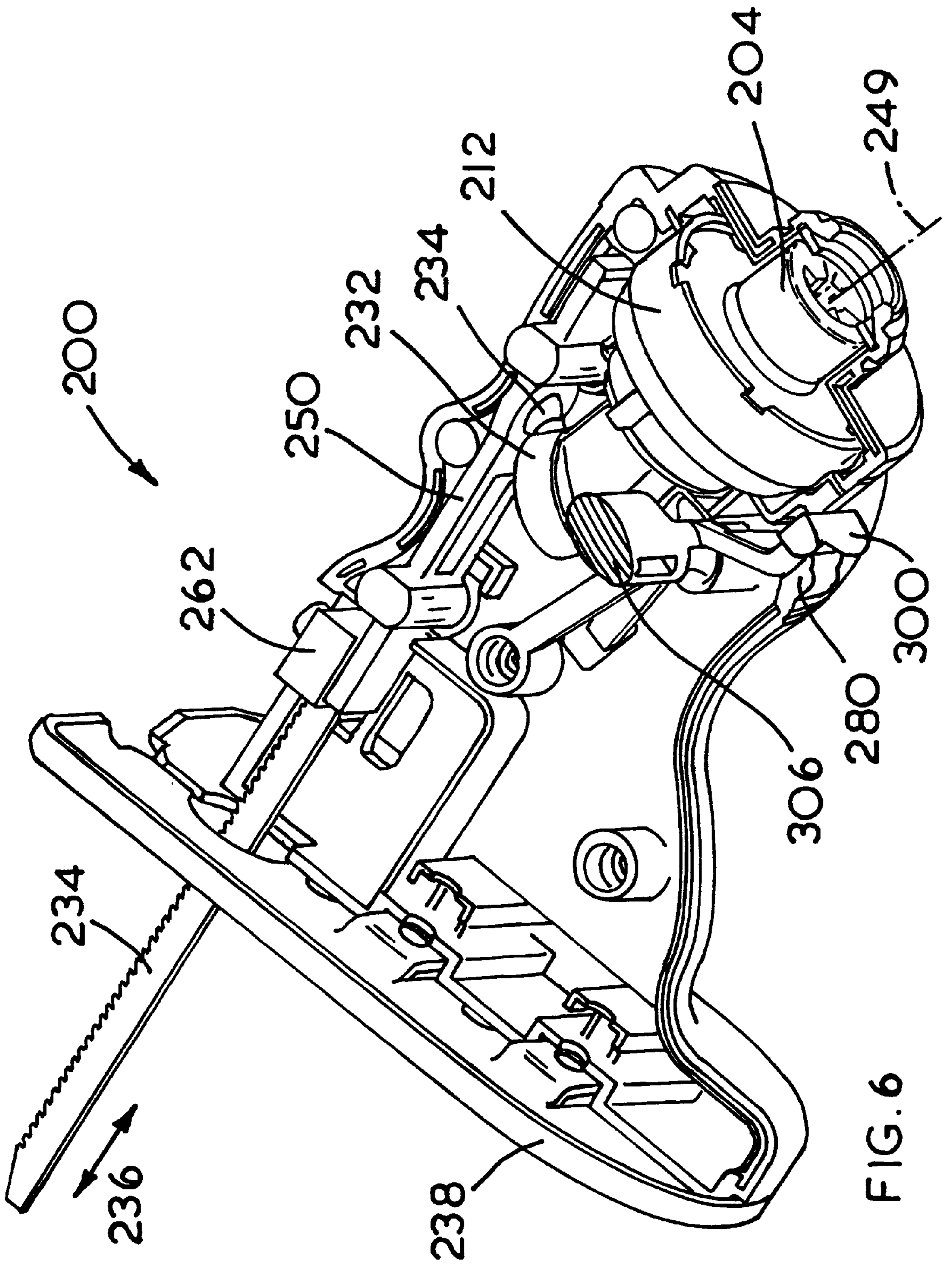
Figure 7:
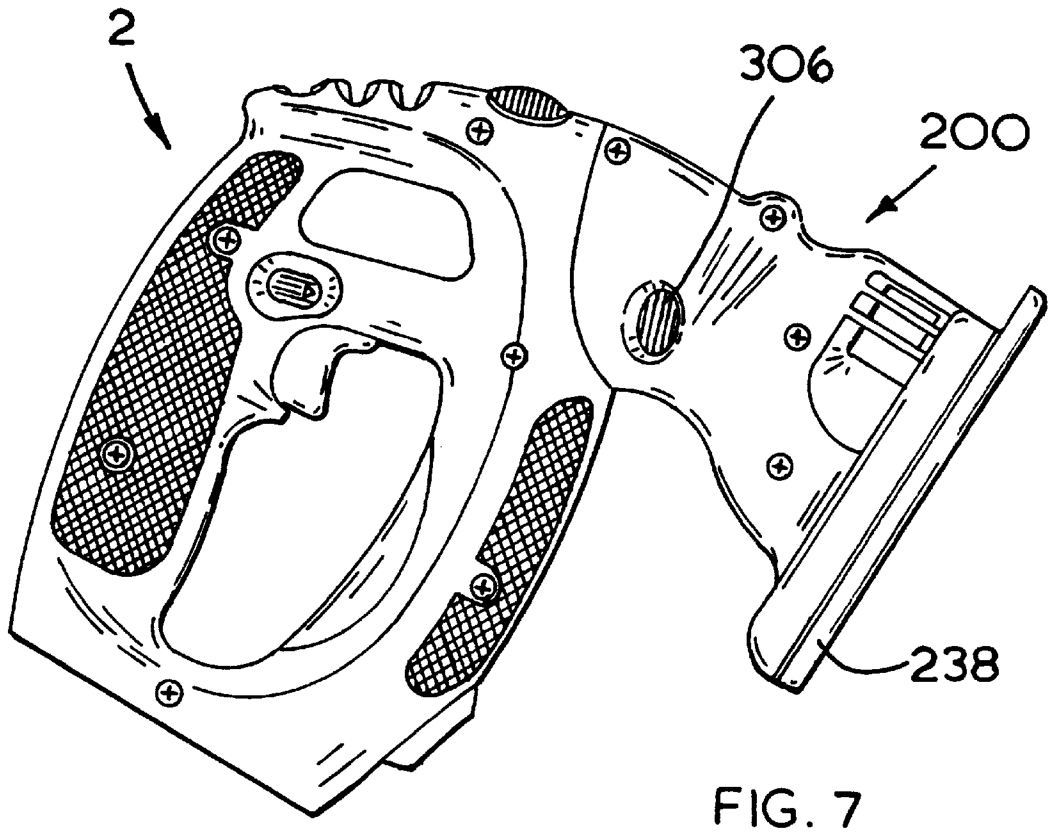
FIG. 7 is a side elevation of the power tool of FIG. 1 with the reciprocating saw head attachment of FIG. 6 connected thereto.

The reciprocating saw tool head (200) (FIG. 6) comprises a clamshell configuration compatible with the clamshell configuration of the tool body. This tool head (200) will comprise a drive spindle (not shown) coupled at its free end with a female cog member (204) which is designed to engage with the male cog (32) from the motor output spindle (24) (FIG. 2). It will be appreciated that the male and the female cogs of the motor spindle (24) and the drive spindle (102) automatically mesh together when a tool head attachment (200) is connected to the body (4), whereby actuation of the motor (20) will then cause simultaneous rotation of the head drive spindle thereby providing rotary drive to the tool head drive mechanism which will herein be described in general terms only. The head drive spindle will be connected to an inner drive cog (not shown) which is designed to drive a conventional sun and planetary gear reduction mechanism illustrated generally at (212). To those skilled in the art the use of a sun and planetary gear reduction mechanism is standard practice and will not be described in detail here save to explain that the motor output speed generally employed in such power tools will be reduced by the gear and planetary reduction mechanism by approximately 80%. As is usual the exact ratio of gear reduction will be dependent on the number of teeth of the cogs employed within this gear arrangement. The gear reduction mechanism (212) then has a rotary output connected to a drive conversion mechanism shown generally at (232) which is used to convert the rotary output of the gear reduction mechanism to linear motion to drive the saw blade (234) in a linear reciprocating motion indicated generally by the arrow (236). As can be seen in FIG. 6, this reciprocating motion is not parallel with the axis of the tool head drive axis (249), this is merely a preference for the ergonomic design of this particular tool head and, if necessary, the use of reciprocating motion could be made parallel with the tool head axis (249) (and subsequently the motor drive) axis (49). The tool head (200) itself is a conventional design for a reciprocating saw having a base plate (238) which is brought into contact with the surface to be cut to stabilise the tool (if required) and again the exterior shape of this tool head has been chosen for ergonomic preference when connected to the tool body, as shown in FIG. 7.

The drive conversion mechanism (232) utilises a conventional reciprocating space crank which will be well-known to those skilled in the art and will not be described in detail herein, but it will be appreciated that alternative methods of converting rotary to linear motion may be employed instead. However, the output of the drive mechanism (232) comprises a pin member (234) which engages a slot within a plate member (250), and which plate member (250) is free to move only in a direction of reciprocation of the saw blade (236) by the use of guide members within the clamshell body. This plate (250) has attached at a free end thereof a blade locking mechanism (262) for engaging a conventional saw blade (234) in a standard manner.

For this reciprocating saw head (200) the connection system (52) does not incorporate the additional projection (94) as previously described with reference to the general connection system. Instead, the clamshells of this tool head (200) form a substantially rectangular opening (280) through which projects a substantially V-shaped cam member (300) (FIGS. 8*a* and 8*b*) This cam member (300) has a general configuration and orientation so that when the saw head (200) is attached to the tool body (4) the cam surface (90) of the lock-off mechanism is received within the inclined V-formation of this cam member (300) without any force being exerted an said cam member (90) to de-activate the lock-off mechanism.

Figure 8A:
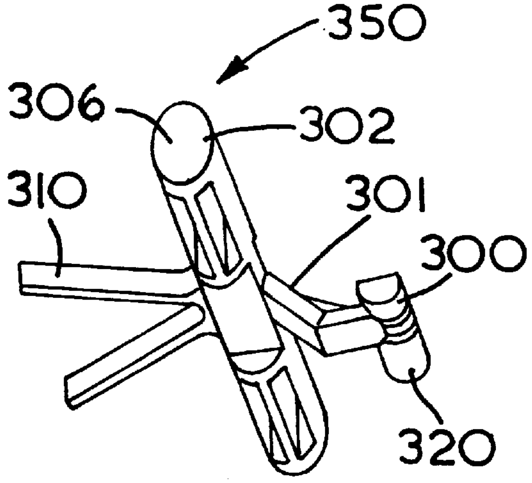
FIG. 8*a* is a perspective view of an actuator member from below.
Figure 8B:
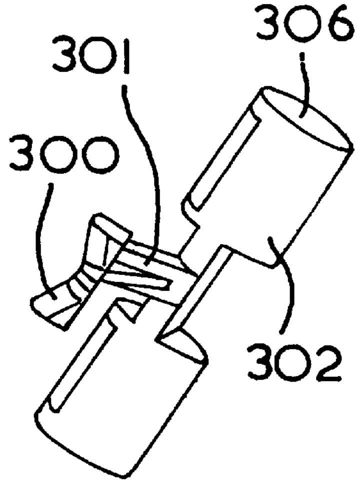
FIG. 8*b* is a perspective view of the actuator member of FIG. 8*a* from above.
Figure 9:
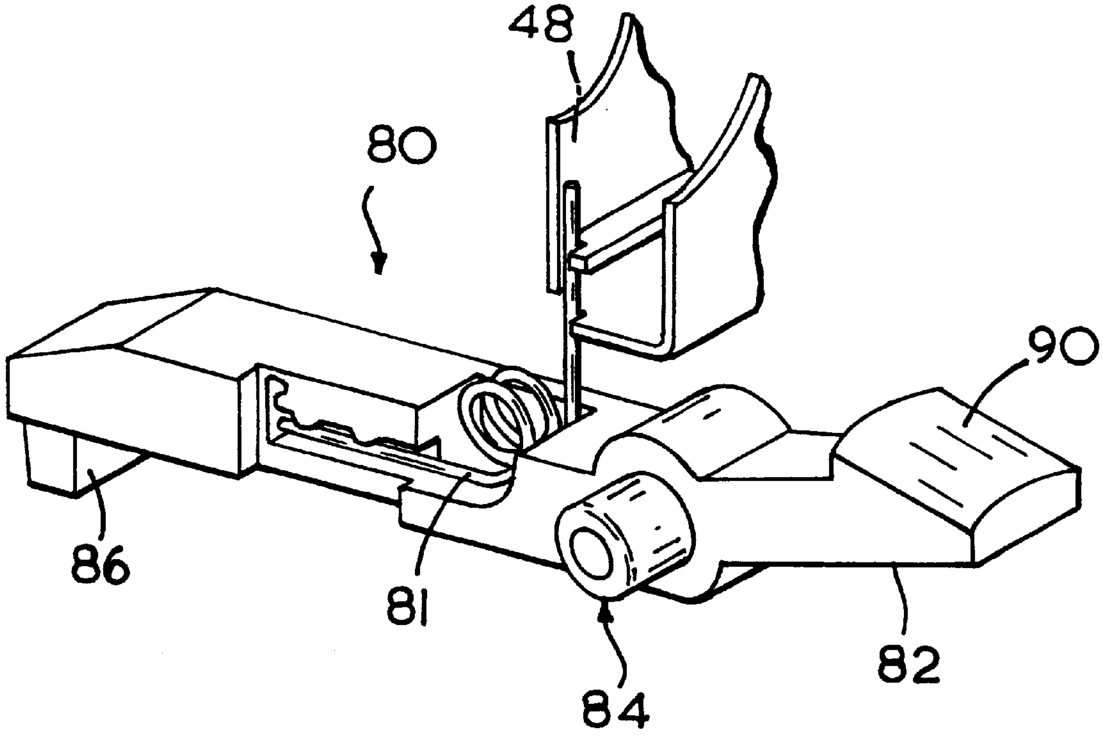
FIG. 9 is a perspective view of a lock-off mechanism.

Referring now to FIGS. 8*a* and 8*b* it can be seen that the cam member (300) is connected by a leg (301) to the mid region of a plastics moulded longitudinally extending bar (302) to form an actuation member (350). This bar (302) when mounted in the tool head extends substantially perpendicular to the axis (249) of the tool head (and to the axis motor of the tool body (49)) so that each of the free ends (306) of the bar (302) project sideways from the opposed side faces of the tool head (FIG. 7) to present two external buttons. Furthermore, the bar member (302) comprises two integrally formed resiliently deflectable spring members (310) which when the bar member (302) is inserted into the tool head clamshells, each engage adjacent side walls of the inner surface of the clamshell, serving to hold the bar member substantially centrally within the clamshell to maintain the cam surface (300) at a substantially central orientation as it projects externally to the rear of the tool head.

A force exerted to either face (306) of the bar member (302) projecting externally of the tool head will displace that face (302) inwardly towards the tool head against the resilience of one of the spring members (310) whereby such displacement of the bar member effects comparable displacement of the cam member (300). It will therefore be appreciated that dependent on which of the two surfaces (306) are depressed, the cam member (300) may be displaced in either direction transversely of the tool head axis. In addition, when the external force is A removed from the sur face (306) the biasing force of the spring member (310) which is resiliently deformed with cause the bar member (302) to return to its original central position. For convenience, this cam and bar member (300 and 302) comprises a one piece moulded plastic unit with the two spring members (310) moulded therewith.

When the tool head (200) is attached to the tool body (4) the cam surface (90) of the lock-off mechanism is received in cooperative engagement within the V-shaped configuration of the cam surface (300). The cam surface (90) (as seen in FIG. 1) has a substantially convex configuration extending along its longitudinal axis having two symmetrically cam faces disposed either side of a vertical plane extending along the central axis of the member (80). Whereas the cam surface (300) has a corresponding concave cam configuration having two symmetrical cam faces inversely orientated to those faces of cam (90) to provide for abutting engagement between the two cam surfaces. When the tool head (200) is attached to the tool body in this manner, the concave cam surface (300) co-operatingly receives the convex cam surface (90) in a close fit so that no undue force is exerted from the cam surface (300) to the cam surface (90) so as to de-activate the lock-off mechanism, which remains engaged with the switch (12) preventing operation of the power tool. This prevents the power saw configuration from being accidentally switched on.

When the saw tool is desired to be operated, the user will place one hand on the pistol grip (10) so as to have the index figure engage the switch (12) with a second hand gripping the tool head attachment (200) in a conventional manner for operating a reciprocating saw. The second hand serving the stabilise the saw in use. The second hand will then serve to be holding the power tool adjacent one of the projecting surfaces (306) of the actuation member (350) which is readily accessible by finger or thumb of that hand. When the operator wishes to then start using the tool he may depress one of these surfaces (306) with his thumb or forefinger cause lateral displacement of the cam surface (300) with regard to the tool head axis (249), causing an inclined surface (320) of the convex surface (300) to move sideways into engagement with one of the convex inclined surfaces of the cam surface (90), effectively displacing the cam member (90) downwardly with respect to the tool body (4), thereby operating the lock-off mechanism (80) in a manner similar to that previously discussed with regard to the automatic lock-off de-activation mechanism.

When the surface (306) is released by the operator the cam surface (300) returns to its central position under the resilient biasing of the spring members (310) and out of engagement with the cam surface (90). However, due to the trigger switch (12) remaining in the actuated position, the lock-off member (80) is unable to re-engage with the switch (12) until that switch (12) is released. Thus, when one of the actuator member (359) buttons (306) on the tool head is depressed, the power tool may be freely used until the switch (12) is released, at which time if the user wishes to recommence operation he will have to again de-activate the lock-off mechanism by depressing one of the buttons (306).

There are many advantages of this particular system the first of which is the manual de-activation of the lock-off mechanism for this particular type of tool head. In addition, the lock-off mechanism is manually de-activated in a region where the user will wish to grip the power tool in order to maintain stability at all times. Thus the user is able to position the saw in the position he wishes to use it, hold the tool steady in this position whilst using the stabilising hand to release the lock-off mechanism prior to starting the tool. This avoids the necessity of holding the tool remote from the area to be cut while the user uses his second hand to de-activate a conventional lock-off switch in the region of the actuation switch (12).

A further advantage of this mechanism is that the tool can be readily used by either a right or left handed person since the manual actuation member (350) may be engaged from either side of the tool head.

Whilst the present invention has been described with reference to a power tool incorporating detachable tool heads, it will be appreciated that the lock-off mechanism may be employed in a conventional power tool whereby the cam surfaces (300 and 90) are housed within the body of such a power tool. However, the projection surfaces (306) remain in a comparable region to those shown in FIG. 7. It will also be appreciated that the cam surface configuration (92 and 300) could be readily reversed so that the lock-off mechanism (80) had a substantially V-shaped cam surface and the tool body comprises substantially concave cam surface. The important factor in the relationship between the two cam surfaces being that each cam surface is mutually inclined to convert transitional movement of the actuation member (359) in a transverse direction to substantially vertical displacement of the cam surface (90) of the lock-off mechanism (80).

As previously mentioned, the above description is for a preferred embodiment only. However, it will be appreciated to those skilled in the art that variations to this basic design may be employed are still falling within the basic inventive concept. In particular, the specific embodiment described a lock-off mechanism (80) being pivotable in a substantially vertical plane through the power tool. However, it is a straight forward engineering variation to alter this pivotal movement to a plane extended substantially perpendicular to such a vertical plane so that the stop member (86) will be pivoted substantially side to side into and out of engagement with the trigger switch (12). In such a situation, the end cam surface (90) as shown would be replaced by a substantially tapering apex having vertical inclined cam surfaces mutually received within a substantially V-shaped cam surface of the actuating member of the tool head so that again transverse displacement of the actuating member in either direction would cause pivotal displacement of the actuating member (80) so as to activate/de-activate the lock-off mechanism as required.

To further modify the inventive concept, it is also envisaged that the pivotal nature of the lock-off mechanism (80) may be replaced by a simple sliding bar mechanism spring biased within a channel into longitudinal engagement with the trigger switch (12). In such a situation, the bar may comprise an aperture having cam surfaces therein for receiving a transversely extending actuation member therethrough with the actuation member again having cam surfaces for reciprocal engagement with those cam surfaces of the bar member to convert the transverse displacement of the actuation member into longitudinal displacement of the bar against its spring biasing in a conventional manner.

In addition, whilst the preferred embodiment discloses an actuation member which is accessible from either side of the tool head, it will be appreciated that, if so required, the actuating member may only be accessible on one side of the power tool.

What is claimed is:

1. In a power tool having a power switch carried by a housing and a tool head attached to the housing, a lock-off mechanism comprising:

a locking member carried by the housing and normally biased to a locked position preventing actuation of the power switch; and an actuation member mounted to the tool head for manual transverse displacement from a neutral position, the actuation member having a first surface for cooperatively engaging a first end of the locking member such that transverse displacement of the actuation member moves the locking member from the locked position to an unlocked position for permitting actuation of the power switch.

2. The lock-off mechanism of claim 1, wherein the actuation member is biased to the neutral position.

3. The lock-off mechanism of claim 2, wherein the actuation member includes at least one spring member for biasing the actuation member to the neutral position.

4. The lock-off mechanism of claim 2, wherein the actuation member includes a pair of spring members for biasing the actuation member to the neutral position.

5. The lock-off mechanism of claim 1, wherein the locking member is pivotally mounted to the housing for movement between the locked position and the unlocked position.

6. The lock-off mechanism of claim 5, wherein the locking member includes a second end for engaging the power switch.

7. The lock-off mechanism of claim 5, wherein the locking member is pivotally mounted to the housing for movement in a plane which is perpendicular to a direction of the transverse displacement of the actuation member.

8. The lock-off mechanism of claim 1, wherein the first surface of the actuation member is a cam surface and the first end of the locking member includes a second cam surface, the first and second cam surfaces configured to cooperate for moving the locking member from the locked position to the unlocked position upon transverse displacement of the actuation member.

9. The lock-off mechanism of claim 1, wherein the actuation member is resiliently biased to the neutral position and displaceable in either transverse direction to effect cam engagement between said first and second cam surfaces.

10. The lock-off mechanism of claim 1, wherein the actuation member projects externally from the tool body to provide an actuation button.

11. The lock-off mechanism of claim 1, wherein the actuation member projects externally from the tool body from opposed sides of the tool body to provide two opposed actuation buttons.

12. The lock-off mechanism of claim 11, wherein said actuation buttons are positioned remote from said switch.

13. A power tool comprising:

a housing;

a tool head releasably attached to the housing; and a lock-off mechanism, the lock-off mechanism including:

a locking member carried by the housing and normally biased to a locked position preventing actuation of the power switch; and an actuation member mounted to the tool head for manual transverse displacement from a neutral position, the actuation member having a first surface for cooperatively engaging a first end of the locking member such that transverse displacement of the actuation member moves the locking member from the locked position to an unlocked position for permitting actuation of the power switch.

14. The power tool of claim 13, wherein the actuation member is biased to the neutral position.

15. The power tool of claim 14, wherein the actuation member includes at least one spring member for biasing the actuation member to the neutral position.

16. The power tool of claim 14, wherein the actuation member includes a pair of spring members for biasing the actuation member to the neutral position.

17. The power tool of claim 13, wherein the locking member is pivotally mounted to the housing for movement between the locked position and the unlocked position.

18. The power tool of claim 12, wherein the locking member includes a second end for engaging the power switch.

19. The power tool of claim 12, wherein the locking member is pivotally mounted to the housing for movement in a plane which is perpendicular to a direction of the transverse displacement of the actuation member.

20. The power tool of claim 13, wherein the first surface of the actuation member is a cam surface and the first end of the locking member includes a second cam surface, the first and second cam surfaces configured to cooperate for moving the locking member from the locked position to the unlocked position upon transverse displacement of the actuation member.

21. The power tool of claim 9, wherein the actuation member is resiliently biased to the neutral position and displaceable in either transverse direction to effect cam engagement between said first and second cam surfaces.

22. The power tool of claim 10, wherein the actuation member projects externally from the tool body to provide an actuation button.

23. The power tool of claim 11, wherein the actuation member projects externally from the tool body from opposed sides of the tool body to provide two opposed actuation buttons.

* * * * *